US012662759B2

(12) United States Patent
Wölfle et al.

(10) Patent No.: US 12,662,759 B2
(45) Date of Patent: **\*Jun. 23, 2026**

(54) FORMALDEHYDE-FREE BINDER COMPOSITION

(71) Applicant: WACKER CHEMIE AG, Munich (DE)

(72) Inventors: Heimo Wölfle, Traunstein (DE); Florian Bauers, Burghausen (DE); Holger Poths, Burghausen (DE)

(73) Assignee: Wacker Chemie AG, Munich (DE)

( \* ) Notice: Subject to any disclaimer, the term of this patent is extended or adjusted under 35 U.S.C. 154(b) by 0 days.

This patent is subject to a terminal disclaimer.

(21) Appl. No.: 17/609,386

(22) PCT Filed: Feb. 6, 2020

(86) PCT No.: PCT/EP2020/052993
§ 371 (c)(1),
(2) Date: Nov. 6, 2021

(87) PCT Pub. No.: WO2021/155932
PCT Pub. Date: Aug. 12, 2021

(65) Prior Publication Data
US 2022/0220646 A1     Jul. 14, 2022

(51) Int. Cl.
*D04H 1/64*          (2012.01)
*C08L 31/04*         (2006.01)

(52) U.S. Cl.
CPC .............. *D04H 1/641* (2013.01); *C08L 31/04* (2013.01)

(58) Field of Classification Search
CPC .......... D04H 1/641; D04H 1/587; D04H 1/64; C08L 31/04; C08F 4/40; C08F 218/08; C09D 131/04; D06M 15/227; D06M 15/285; D06M 15/333; D06M 15/263; D06M 17/06; C09J 131/04; C09J 11/08
See application file for complete search history.

(56)                References Cited

U.S. PATENT DOCUMENTS

| | | | |
|---|---|---|---|
| 4,339,552 A | | 7/1982 | Lindemann |
| 4,449,978 A | * | 5/1984 | Iacoviello .............. D21H 17/35 442/167 |
| 5,087,487 A | * | 2/1992 | Katz ................... D06M 15/327 427/389.9 |
| 5,763,022 A | | 6/1998 | Lumpp et al. |

FOREIGN PATENT DOCUMENTS

| | | |
|---|---|---|
| CN | 106536663 A | 3/2017 |
| EP | 0184153 B1 | 7/1991 |
| EP | 0609849 A1 | 8/1994 |
| EP | 0596318 B1 | 11/1994 |
| JP | 2008297523 A | 12/2008 |
| WO | 96/08597 A1 | 3/1996 |
| WO | 2013/085764 A1 | 6/2013 |
| WO | 2013/124417 A1 | 8/2013 |
| WO | 2017/189350 A1 | 11/2017 |

* cited by examiner

*Primary Examiner* — Elizabeth M Imani

(57)                ABSTRACT

An aqueous binder composition. The aqueous binder composition is obtainable by radically initiated polymerization of vinyl acetate and ethylene, in the presence of polyvinyl alcohol in an aqueous medium, wherein (a) 50 to 94 wt % of vinyl acetate, (b) 5 to 40 wt % of ethylene, (c) 0.2 to 5 wt % of acrylamide and/or methacrylamide, and (d) 0.2 to 5 wt % of maleic anhydride and/or maleic acid are copolymerized in the presence of a polyvinyl alcohol having a degree of hydrolysis of 80 to 99 mol %. The amounts in wt % are each based on the total weight of the comonomers and add up in each case to 100 wt %.

19 Claims, No Drawings

FORMALDEHYDE-FREE BINDER COMPOSITION

CROSS-REFERENCE TO RELATED APPLICATIONS

This application is a U.S. National Phase application of PCT Application No. PCT/EP2020/052993 filed on Feb. 6, 2020 the disclosure of which is incorporated by reference herein in its entirety.

FIELD OF THE DISCLOSURE

The invention relates to a formaldehyde-free binder composition and to the use thereof for producing textile sheet products.

Binder compositions for textile sheet products generally comprise a binder component in the form of polymers based on ethylenically unsaturated monomers, and are usually present in aqueous dispersion. The polymers typically comprise units of crosslinking monomers and are therefore capable of crosslinking with each other and optionally also with fibers and hence of contributing to the formation of textile sheet products of higher strength. This makes it possible to achieve durable fixation of the fibers and also an enhanced ability of the textile sheet products to resist mechanical loading. Textile sheet products are known by the term "nonwovens", among others, and may be produced for example by the airlay, wetlay or spunlay process.

Industrial practice has hitherto been dominated by binder components in the form of polymers comprising N-methylolacrylamide units (NMA). N-methylolacrylamide groups can react with the OH groups of cellulose or starch and consequently lead to covalent bonds between binder polymer and fiber. In the course of crosslinking, unfortunately, such polymers form formaldehyde, which is deprecated for toxicological reasons. In addition, such polymers in many cases, as a consequence of their production, already include formaldehyde as a concomitant, as in the case, for example, of production by polymerization using formaldehyde-releasing initiators, such as sodium formaldehyde-sulfoxylate.

There is therefore a need to minimize the formaldehyde content of the binder compositions and to provide access in an efficient way to textile sheet products which are very largely formaldehyde-free.

Formaldehyde reduction in an aqueous polymer dispersion is pursued in EP 0 596 318 B1 by the use during the polymerization, in place of sodium formaldehyde-sulfoxylate of ascorbic acid as a reducing agent in the redox initiator system. WO 201 3/1 2441 7 A1 describes an NMA-containing nonwoven binder wherein some of the N-methylolacrylamide monomer units have been replaced with acrylamide monomer units. From WO 2017/189350 A1, the use is known of polyvinyl alcohol-stabilized vinyl acetate-ethylene copolymers, with a combination of N-methylolacrylamide and acrylamide comonomer units. WO 2013/085764 A1 describes a fiber binder based on a polyvinyl alcohol-stabilized vinyl acetate-ethylene copolymer dispersion which contains no N-methylolacrylamide that includes ammonium chloride for improving the wet strength of the binder. A nonwoven binder in the form of an aqueous, emulsifier-stabilized dispersion of a vinyl acetate-ethylene copolymer having N-butoxymethyl acrylamide and acrylamide monomer units is described by EP 0 609 849 A1. EP 0 184 153 B1 describes formaldehyde-free latex binders, stabilized with anionic emulsifier, which are based on acrylic ester copolymers having acrylamide and dicarboxylic acid monomer units.

JP 2008-297523 A describes adhesive bonding compositions based on polyvinyl alcohol-stabilized vinyl acetate-ethylene copolymers, additionally containing comonomer units deriving from acrylamide and acrylic acid.

An object of the invention was to provide an aqueous binder for the fiber binding that results in high wet strength of the fiber assembly even without addition of crosslinking catalyst, and without releasing formaldehyde.

A subject of the invention is an aqueous binder composition for fiber binding, obtainable by radically initiated polymerization of vinyl acetate and ethylene, in the presence of polyvinyl alcohol in aqueous medium, characterized in that a) 50 to 94 wt % of vinyl acetate,
b) 5 to 40 wt % of ethylene,
c) 0.2 to 5 wt % of acrylamide and/or methacrylamide,
d) 0.2 to 5 wt % of maleic anhydride and/or maleic acid, are copolymerized in the presence of a polyvinyl alcohol having a degree of hydrolysis of 80 to 99 mol %, where the amounts in wt % are each based on the total weight of the comonomers and add up in each case to 100 wt %.

Preferably a) 70 to 85 wt % of vinyl acetate are copolymerized, based on the total weight of the comonomers.

Preferably b) 15 to 28 wt % of ethylene are copolymerized, based on the total weight of the comonomers.

Preferably c) 0.5 to 2 wt %, more preferably 0.7 to 1.2 wt %, of acrylamide and/or methacrylamide are copolymerized, based in each case on the total weight of the comonomers. Preferably only acrylamide is copolymerized as comonomer c).

Preferably d) 0.2 to 3 wt %, more preferably 0.4 to 1.5 wt %, of maleic anhydride and/or maleic acid are copolymerized, based in each case on the total weight of the comonomers. Preferably only maleic anhydride is copolymerized as comonomer d).

In another preferred embodiment the monomers c) and d) may be replaced wholly or partly by maleamic acid.

Preferably no acrylic acid and/or methacrylic acid are copolymerized.

The polymers are obtainable by radically initiated polymerization. The polymers may be prepared in a conventional way, for example, by the suspension polymerization process or preferably by the emulsion polymerization process in water. The polymerization temperature is generally 20° C. to 120° C. and operation takes place under pressure, generally between 5 bar and 100 bar. The polymerization may be initiated with the water-soluble or monomer-soluble initiators, or redox initiator combinations, that are customary for emulsion polymerization or suspension polymerization. Preferred reducing agents are ascorbic acid, isoascorbic acid or salts thereof, or formaldehyde-free reducing agents such as Brüggolith FF6. Preferred oxidizing agents are persulfate compounds and peroxide compounds, especially ammonium persulfates or alkali metal persulfates or hydrogen peroxide. Preferably no formaldehyde-releasing substances, such as formaldehyde-sulfoxylates, are used as initiators.

The polymerization takes place in the presence of preferably 1 to 10 wt %, based on the total weight of the comonomers, of one or more polyvinyl alcohols having a degree of hydrolysis of in each case 80 to 99 mol %, preferably 85 to 90 mol %, more preferably 87 to 89 mol %. The Höppler viscosity in 4% aqueous solution of the polyvinyl alcohols is generally 2 to 40 mPas, preferably 2 to 15 mPas (Höppler method at 20° C., DIN 53015). The stated polyvinyl alcohols are available commercially and accessible by methods known to the skilled person.

Optionally small amounts of emulsifiers may additionally be used in the polymerization, at 0.1 to 2.0 wt %, for example, based on the total weight of the comonomers. Preferably no emulsifiers are used during the polymerization. The aqueous dispersions generally have a solids content of 40 to 60 wt % and preferably 45 to 55 wt %. The Brookfield viscosity of the aqueous dispersion is preferably 50 to 2000 mPas, more preferably 100 to 1500 mPas (determined with a Brookfield viscometer at 23° C. and 20 rpm for dispersions with a solids content of 49 to 51 wt %).

The binder compositions may also comprise one or more additives, examples being emulsifiers, such as fatty alcohol ethoxylates with low degrees of ethoxylation, especially 2 to 5, or diisotridecylsulfosuccinate or salts thereof, such as sodium salts. Typical service amounts of emulsifiers, based on the dry weight of the polymer, are 0 to 1 wt %, preferably 0 to 0.6 wt %. With emulsifiers it is possible to increase the hydrophilicity of the textile sheet products furnished with such binder compositions. Other additives are acidic catalysts, such as ammonium chloride, citric acid or sulfuric acid. Acidic catalysts are added typically in amounts of 0 to 2 wt %, preferably 0.1 to 1 wt %, based on the dry weight of the polymer. If the acidic catalysts are Brönstedt acids, the amount thereof used is such as to result in a pH of preferably 0 to 4 and more preferably of 2 to 3. Most preferably no catalysts are used in the aqueous binder composition.

The use of the invention for producing the textile sheet products takes place in general by contacting fibers with one or more than one aqueous binder composition of the invention and subsequently drying them. Drying takes place preferably at temperatures of ≤ 160° C., more preferably 120 to 160° C. and most preferably at 140 to 160° C.

The fibers are based generally on natural or synthetic, especially organic, materials. Examples thereof are manufactured fibers based on fiber-forming polymers such as viscose, polyester, polyamide, polypropylene and polyethylene fibers. Examples of natural fiber materials are wood, wool, cotton, jute, flax, hemp, coir, ramie, sisal and, in particular, cellulose fibers. The fibers may be loose or else in the form of bundles or woven textiles, yarns, or preferably in the form of nonwovens, such as webs, laid-scrim or knitted fabrics, for use. The nonwovens may optionally have undergone thermal or mechanical preconsolidation, by needling, for example.

The fibers may have any lengths, preferably 5 mm to 100 mm, more preferably 7 mm to 75 mm and most preferably 10 mm to 60 mm. The fibers may have the usual diameters, preferably diameters from 0.1 μm to 1 mm, more preferably 0.5 μm to 100 μm and most preferably 1 μm to 50 μm.

The textile sheet products are produced in the invention by using the aqueous binder composition in an amount of preferably 1 to 50 wt %, more preferably 10 to 30 wt % and most preferably 15 to 25 wt %, based in each case on the total weight of the fibers. The fraction of the fibers is preferably 40 to 99 wt %, more preferably 60 to 90 wt % and most preferably 70 to 80 wt %, based in each case on the total weight of the textile sheet products.

One possible procedure for producing the textile sheet products in the invention is to spread the fibers out in the manner of a sheet prior to consolidation. The methods of accomplishing this are known and are dependent primarily on the intended application for the consolidated fiber material. The fibers may be laid out, for example, by means of an airlay, wetlay, direct spinning or carding apparatus. Binder consolidation may optionally be preceded by mechanical consolidation, by cross-laying, needling or water jet consolidation, for example. Thereafter the binder composition may be applied to the laid-out fibers, with the binder compositions being able to be applied extensively, spotwise or in patterns. The fibers may subsequently be bound by application of temperature and optionally pressure.

The aqueous binder composition is also suitable for producing laminates, in which case two fiber plies are bonded to one another, or one fiber ply is bonded to another substrate. This can be done by laying out a fiber ply, with the binder composition being applied after layout, and laying on a further fiber ply, by airlaying, for example. Instead of the second fiber ply it is also possible for a different substrate to be laid on, such as a plastics film. This is followed by binding through application of temperature and optionally pressure. This procedure can be used, for example, to access insulating materials made from reclaimed cotton and durably clad with a fiber web as surfacing material.

The binder compositions are also suitable for producing lofty nonwovens or waddings, which find use, for example, as semifinished products in the production of moldings from fiber materials, or as padding, insulating and filter waddings. For these purposes the binder compositions may be applied to the fibers and consolidated by an increase in temperature, preferably in a mold.

The textile sheet products produced in the invention are preferably nonwovens, more particularly tissues, felts, waddings or coarse-mesh, loose woven or knitted fabrics. The textile sheet products may be employed, for example, in the automobile sector, for household products such as tablecloths, hygiene articles, such as toilet paper, in the clothing industry, for medical textiles or geotextiles.

The examples hereinbelow serve for further illustration of the invention:

Binder composition:

For testing, aqueous dispersions of vinyl acetate-ethylene copolymer dispersions with a solids content of around 55% were prepared.

Preparation took place by emulsion polymerization of 76 to 78 wt % of vinyl acetate, 21 to 22 wt % of ethylene, and the amounts in wt %, as specified in table 1, of acrylamide (AA), acrylic acid (AS), maleic anhydride (MSA) and N-methylolacrylamide (NMA).

Each polymerization took place in a pressure-rated reactor in a temperature range from 40 to 75° C. under a pressure of up to 85 bar.

Polymerization was carried out in the presence of 10 wt %, based on the total wt % of the comonomers, of a polyvinyl alcohol (PVOH) having a Höppler viscosity of 5 mPas (4% aqueous solution) and a degree of hydrolysis of 88 mol %. Initiation was carried out using hydrogen peroxide and Brüggolith FF6.

TABLE 1

| Example | AA (%) | AS (%) | MSA (%) | NMA (%) | Stabilization |
|---|---|---|---|---|---|
| Inv. ex. 1 | 1 | 0 | 1 | 0 | PVOH |
| Inv. ex. 2 | 1 | 0 | 2 | 0 | PVOH |
| Comp. ex. 1 | 0 | 0 | 0 | 0 | PVOH |
| Comp. ex. 2 | 0 | 0 | 0.5 | 0 | PVOH |
| Comp. ex. 3 | 1 | 1 | 0 | 0 | PVOH |
| Comp. ex. 4 | 0 | 0 | 0 | 1 | PVOH |
| Comp. ex. 5 | 1 | 1 | 0 | 0 | Emulsifier |
| Comp. ex. 6 | 1 | 1 | 0.5 | 0 | Emulsifier |

Determination of wet strength values for airlaid nonwovens:

A thermally prebonded airlaid web (75 g/m²; 88% fluff pulp and 12% PP/PE bicomponent fibers; 0.85 mm thickness) was sprayed homogeneously on both sides with the polymer dispersion of the respective (comparative or inventive) example, diluted to a solids content of 20% with water, using a spray liquor and a semi-automatic spraying assembly, by the airless method (Unijet 8001 E slot dies; 5 bar), and then dried in a laboratory through-air dryer (Mathis LTF; Mathis/CH) at 160° C. for 3 min (application quantity: 20 wt % of polymer based on total weight of polymer and web).

For each breaking strength test, 10 web strips (20 cm clamped length; 5 cm clamped length) were prepared in the cross direction to the machine production direction. For measurement of the wet breaking strengths, the strip samples were each stored in water for 1 min prior to measurement.

The wet breaking strengths were determined in analogy to DIN EN 29073 (Part 3: Test methods for nonwovens, 1992) and the measurement samples underwent an ultimate tensile force measurement on a Zwick® 1445 testing machine (100 N load cell) using TestXpert® Software Version 11.02 (from Zwick Roell), with a clamped length of 100±1 mm, a clamped width of 15±1 mm and a deformation rate of 150 mm/min.

The results of the testing are summarized in table 2.

TABLE 2

| Example | AA (%) | AS (%) | MSA (%) | NMA (%) | Wet strength (N/5 cm)* |
|---|---|---|---|---|---|
| Inv. ex. 1 | 1 | 0 | 1 | 0 | 1032/— |
| Inv. ex. 2 | 1 | 0 | 2 | 0 | 1381/— |
| Comp. ex. 1 | 0 | 0 | 0 | 0 | 361/— |
| Comp. ex. 2 | 0 | 0 | 0.5 | 0 | 861/— |
| Comp. ex. 3 | 1 | 1 | 0 | 0 | 556/609 |
| Comp. ex. 4 | 0 | 0 | 0 | 1 | 1020/1570 |
| Comp. ex. 5 | 1 | 1 | 0 | 0 | 149/— |
| Comp. ex. 6 | 1 | 1 | 0.5 | 0 | 383/415 |

*= no catalyst/1% citric acid,
— = not measured

Inventive examples 1 and 2 show that high wet breaking strengths are obtained with the binder composition of the invention, even without addition of catalyst. In NMA-containing binder compositions, such as that of comparative example 4, lower values are obtained, with the further disadvantage of release of formaldehyde.

In contrast to the polyvinyl alcohol-stabilized binder composition in inventive examples 1 and 2, the values obtained with the emulsifier-stabilized binder composition of comparative examples 5 and 6 were inadequate.

The invention claimed is:

1. An aqueous binder composition for fiber binding, comprising:
   wherein the aqueous binder composition is obtainable by radically initiated polymerization of comonomers in the presence of polyvinyl alcohol in an aqueous medium;
   wherein the comonomers used within the aqueous binder composition are consisting of
   a) 50 to 94 wt % of vinyl acetate,
   b) 5 to 40 wt % of ethylene,
   c) 0.2 to 5 wt % of acrylamide and/or methacrylamide, and d) 0.2 to 5 wt % of maleic anhydride and/or maleic acid;
   wherein the comonomers are copolymerized in the presence of a polyvinyl alcohol having a degree of hydrolysis of 80 to 99 mol %; and
   wherein the amounts in wt % are each based on the total weight of the comonomers and add up in each case to 100 wt %.

2. The composition of claim 1, wherein the aqueous binder composition further comprises one or more emulsifiers.

3. The composition of claim 1, wherein the comonomer a) 70 to 85 wt % of vinyl acetate is copolymerized, based on the total weight of the comonomers; or
   wherein the comonomer b) 15 to 28 wt % of ethylene is copolymerized, based on the total weight of the comonomers; or
   wherein the comonomer c) 0.5 to 2 wt % of acrylamide is copolymerized, based on the total weight of the comonomers; or
   wherein the comonomer d) 0.2 to 2 wt % of maleic anhydride is copolymerized, based on the total weight of the comonomers.

4. The composition of claim 1, wherein the aqueous binder is used for producing textile sheet products.

5. The composition of claim 4, wherein fibers are contacted with the aqueous binder composition and subsequently dried.

6. The composition of claim 1, wherein the aqueous binder composition does not contain an acidic catalyst selected from the group consisting of ammonium chloride, citric acid or sulfuric acid.

7. The composition of claim 1, wherein there are no acid catalysts included within the aqueous binder composition.

8. The composition of claim 1, wherein the aqueous binder composition does not contain any acidic catalysts, which are Brönstedt acids, in an amount to result in a pH of 0 to 4.

9. A textile sheet product, comprising:
   an aqueous binder composition that is obtainable by radically initiated polymerization of comonomers in the presence of polyvinyl alcohol in an aqueous medium;
   wherein the comonomers used within the aqueous binder composition are consisting of
   a) 50 to 94 wt % of vinyl acetate,
   b) 5 to 40 wt % of ethylene,
   c) 0.2 to 5 wt % of acrylamide and/or methacrylamide, and
   d) 0.2 to 5 wt % of maleic anhydride and/or maleic acid;
   wherein the comonomers are copolymerized in the presence of a polyvinyl alcohol having a degree of hydrolysis of 80 to 99 mol %; and
   wherein the amounts in wt % are each based on the total weight of the comonomers and add up in each case to 100 wt %.

10. The textile sheet product of claim 9, wherein the aqueous binder composition further comprises one or more emulsifiers.

11. The textile sheet product of claim 10, wherein the one or more emulsifiers are fatty alcohol ethoxylates with a degree of ethoxylation from 2 to 5, sodium salt, diisotridecylsulfosuccinate or salts thereof.

12. The textile sheet product of claim 10, wherein the one or more emulsifiers are present at an amount less than or equal to 0.6 wt % based on the dry weight of the polymer.

13. The textile sheet product of claim 9, wherein there are no acid catalysts included within the aqueous binder composition.

14. The textile sheet product of claim 9, wherein fibers are contacted with the aqueous binder composition and subsequently dried.

15. The textile sheet product of claim 13, wherein the fibers are nonwoven, polyamide, flax, hemp, coir and/or ramie.

16. The textile sheet product of claim 9, wherein the comonomer a) 70 to 85 wt % of vinyl acetate is copolymerized, based on the total weight of the comonomers; or wherein the comonomer b) 15 to 28 wt % of ethylene is copolymerized, based on the total weight of the comonomers; or wherein the comonomer c) 0.5 to 2 wt % of acrylamide is copolymerized, based on the total weight of the comonomers; or wherein the comonomer d) 0.2 to 2 wt % of maleic anhydride is copolymerized, based on the total weight of the comonomers.

17. The composition of claim 2, wherein the one or more emulsifiers are fatty alcohol ethoxylates with a degree of ethoxylation from 2 to 5, sodium salt, diisotridecylsulfosuccinate or salts thereof.

18. The composition of claim 2, wherein the one or more emulsifiers are present at an amount less than or equal to 0.6 wt % based on the dry weight of the polymer.

19. The composition of claim 5, wherein the fibers are nonwoven, polyamide, flax, hemp, coir and/or ramie.

\* \* \* \* \*